United States Patent [19]
Damratowski

[11] 3,971,421
[45] July 27, 1976

[54] AIR-POWERED, SELF-FEEDING SCREW DRIVING TOOL

[75] Inventor: Harold E. Damratowski, Alda, Nebr.

[73] Assignee: Triad Fastener Corporation, Alda, Nebr.

[22] Filed: Mar. 31, 1975

[21] Appl. No.: 563,819

Related U.S. Application Data

[63] Continuation-in-part of Ser. No. 446,023, Feb. 26, 1974, abandoned.

[52] U.S. Cl. .............................. 144/32; 29/211 R; 29/240; 173/107; 226/77; 226/157
[51] Int. Cl.² ........................................ B26B 23/00
[58] Field of Search ............... 144/32; 226/77, 157; 29/211 R, 212, 240; 83/54; 173/107

[56] References Cited
UNITED STATES PATENTS

| | | | |
|---|---|---|---|
| 2,776,681 | 1/1957 | Hopkins | 144/32 |
| 2,951,516 | 9/1960 | Chilton | 144/32 |
| 3,526,257 | 9/1970 | Kirkland | 144/32 |

Primary Examiner—Othell M. Simpson
Assistant Examiner—W. D. Bray
Attorney, Agent, or Firm—Melville, Strasser, Foster & Hoffman

[57] ABSTRACT

An air-powered, self-feeding screw driving tool and screw-containing pods capable of being assembled into a continuous belt of screw-containing rods for use with the tool. The belt of screw-containing pods are coiled within a canister for selective feeding therefrom by an air-powered pawl operated star wheel. The pods are sequentially positioned forward of the bit of a carriage mounted air-powered screwdriver which is selectively operated in coordinated relationship with the orientation of the screw-containing pods by a common air source utilizing a single trigger control.

Each of the screw-containing pods has means therein to retain a screw and to guide the screw as it is being driven into the workpiece. When formed into a belt, the individual pods are so joined that the belt may be coiled to be received in the tool canister and the belt may be twisted so that the axes of the pods of that part of the belt being fed by the star wheel lie at substantially right angles to the pods of that portion of the belt coiled within the tool canister.

18 Claims, 15 Drawing Figures

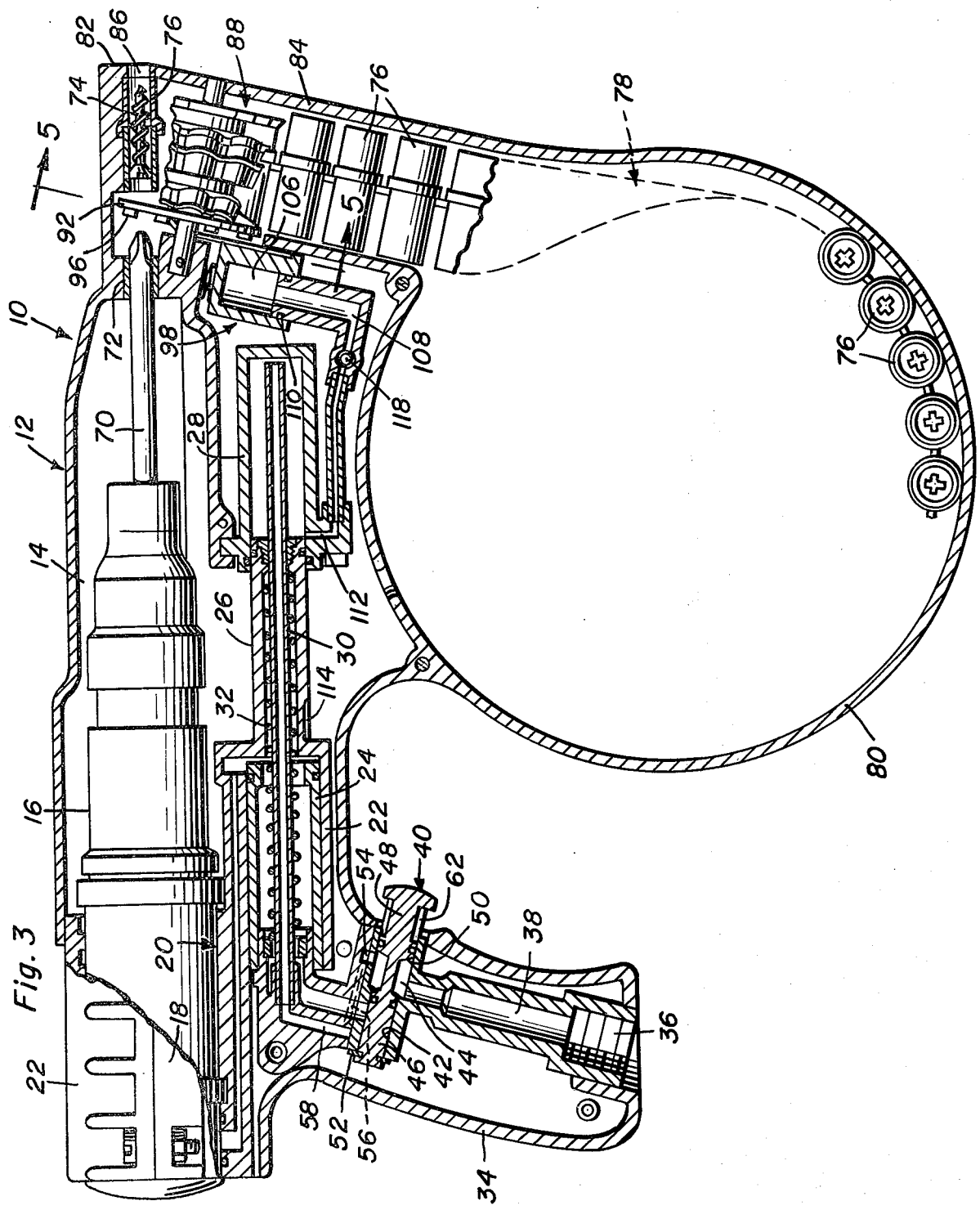

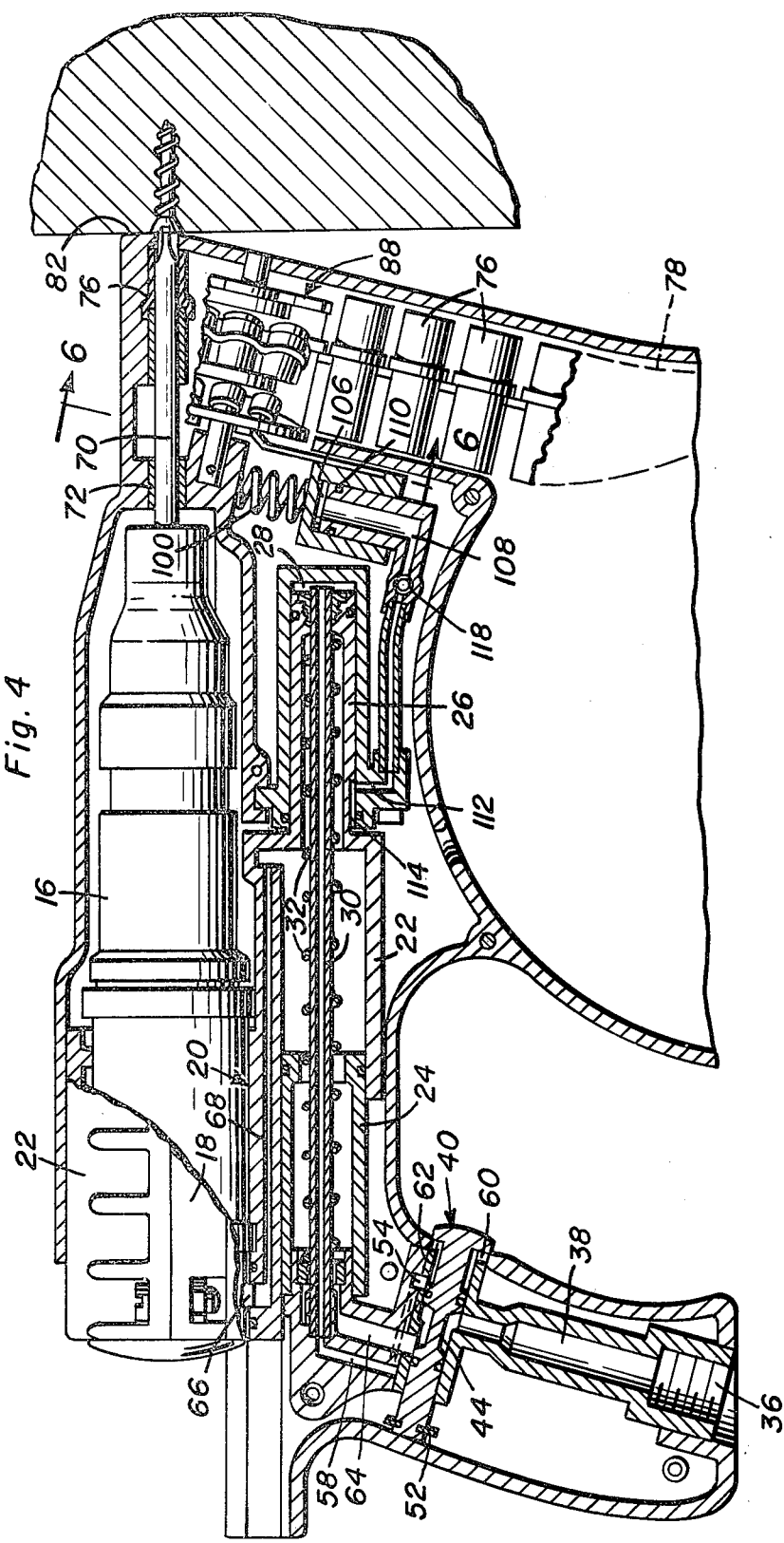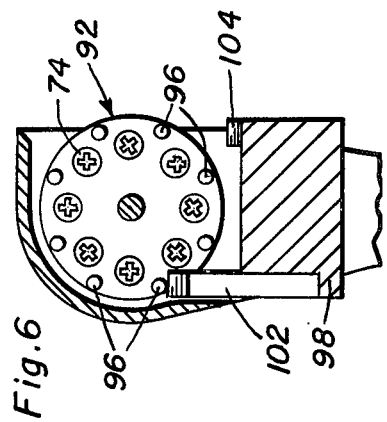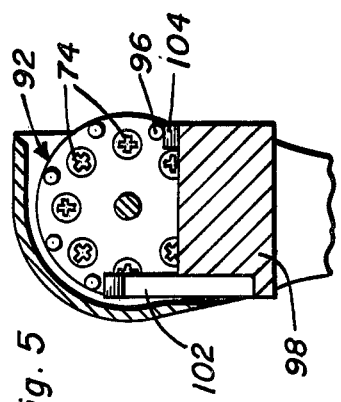

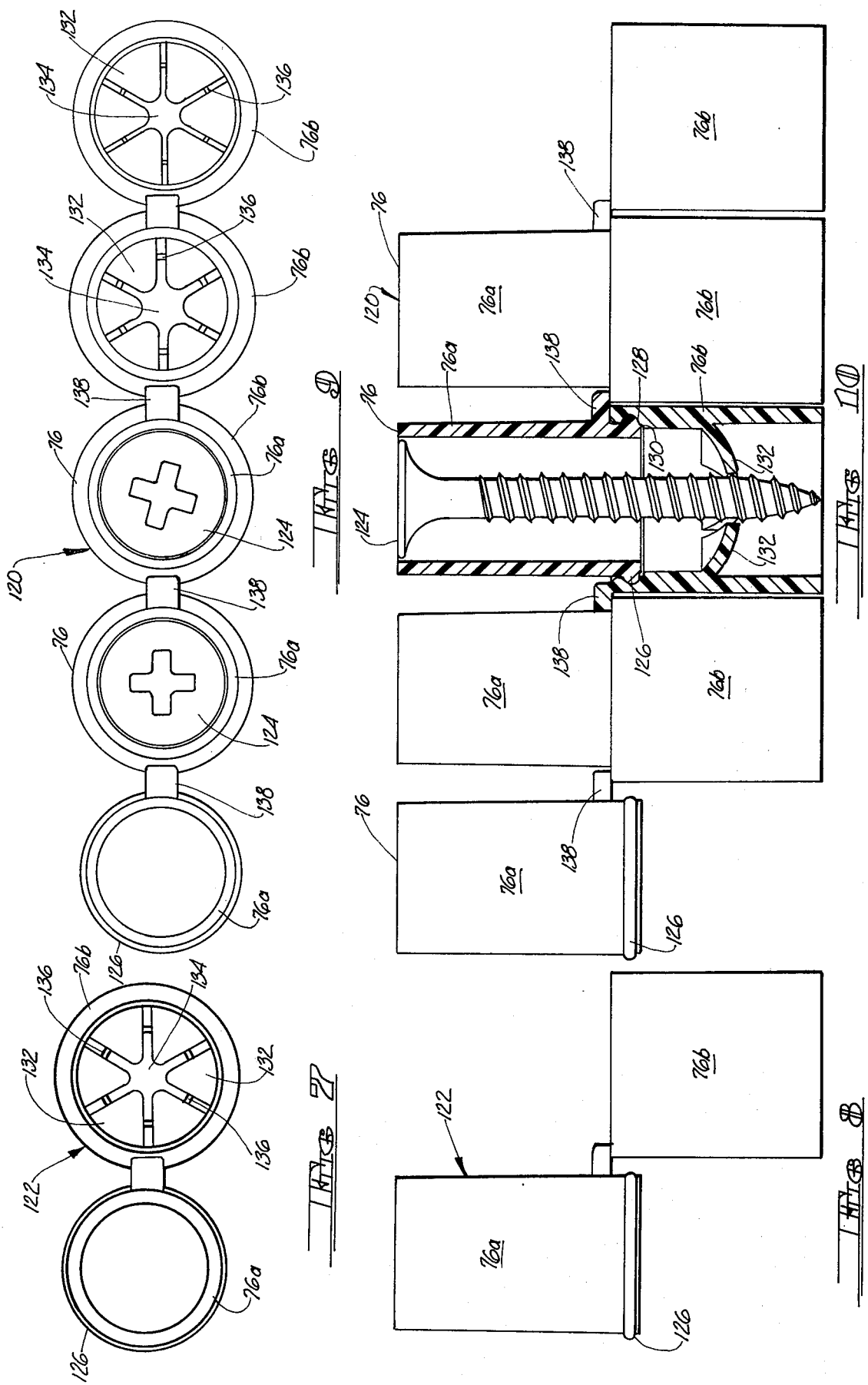

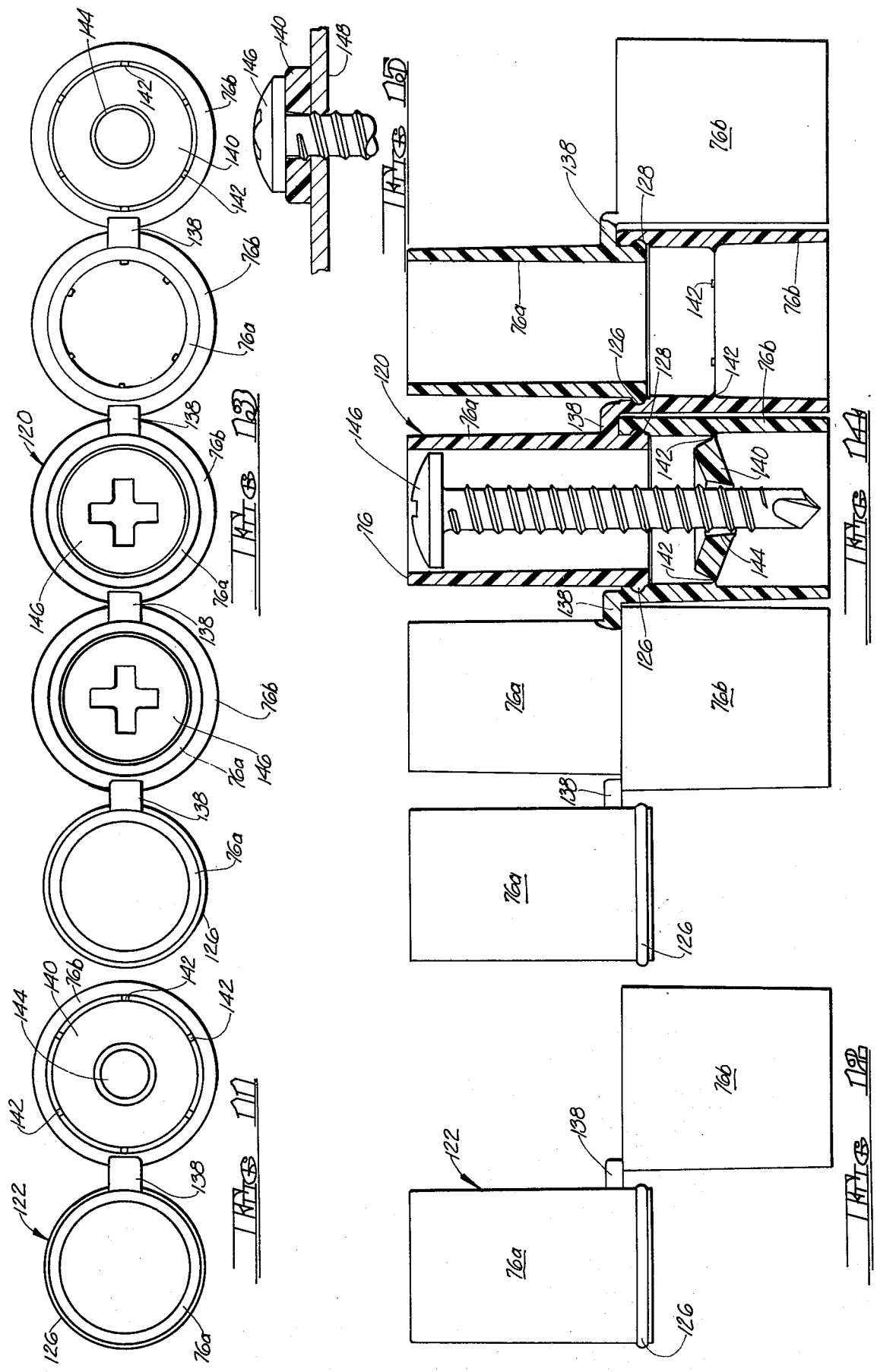

AIR-POWERED, SELF-FEEDING SCREW DRIVING TOOL

REFERENCE TO RELATED APPLICATION

This is a continuation-in-part of the copending application Ser. No. 446,023, filed Feb. 26, 1974 in the name of the same inventor and entitled "AIR-POWERED, SELF-FEEDING SCREW DRIVING TOOL", now abandoned.

BACKGROUND OF THE INVENTION

The present invention relates to new and useful improvements in automatic screwdriving apparatus.

More particularly, the apparatus or tool of the invention involves the provision of a compact unit which mounts a conventional air-powered screwdriver in operative relationship to screw feeding apparatus and an associated supply canister with the feeding apparatus and screwdriver being operative by means of a single trigger valve for a sequential advancing of the screws and an individual driving thereof. The tool utilizes a single poser source with the two operative assemblies, the screw feeding means and the screwdriver, being synchronized for a rapid sequential presentation and driving of the screws.

In operation, the operator need merely hold the tool against the work and depress the trigger. The apparatus will automatically activate the carriage mounted screwdriver and move the screwdriver forward in conjunction with the driving of the screw. The operator need not follow the screw forward as it is driven. By the same token, the physical makeup of the apparatus is such so as to enable its use in substantially any position, including up to one-half inch of a corner.

It is contemplated that the entire assembly, including a load of one hundred screws, will weigh approximately four pounds, thus being easily held and manipulated.

The invention further relates to improved screw-containing pods formable into a belt thereof. The belt of pods is capable of flexure in two directions as will be described hereinafter.

SUMMARY OF THE INVENTION

The air-powered, self-feeding screwdriving tool of the present invention is adapted to be used with a belt of screw-containing pods. The tool comprises a housing provided with a pistol grip and a canister to receive the belt of screw-containing pods. A conventional air-powered screwdriver is mounted on a carriage within the housing. An air-powered pawl operates a star wheel unit which serves to draw the belt of screw-containing pods from the canister through a throat at the forward end of the tool and to present a single pod in appropriate position for each screwdriving operation. During a screwdriving operation the carriage and air-powered screwdriver are shifted forwardly to drive the screw from its respective pod and into the workpiece. The screwdriver itself, the carriage upon which it is mounted and the star wheel operating pawl are all actuated in appropriate sequence by a common air source under the influence of a single trigger control.

The belt of screw-containing pods of the present invention is capable of both coiling and twisting, as will be described hereinafter. Each screw-containing pod is provided with guide means to maintain the screw shank in alignment within the pod and properly oriented during the screwdriving operation. In one embodiment, this guide means comprises a plurality of finger-like elements within the pod. In another embodiment the guide means constitutes a disk-like element within the pod having a central perforation through which the screw shank extends. As the screw is driven into the workpiece, the disk-like element is dislodged from the pod and serves as a washer for the screw.

BRIEF DESCRIPTION OF THE DRAWINGS

FIG. 3 is an enlarged transverse cross-sectional view through the apparatus in a first position thereof wherein the screwdriver is retracted and the pod feeding assembly advanced.

FIG. 4 is a cross-sectional view similar to FIG. 3 wherein the screwdriver is illustrated in its advanced screwdriving position.

FIG. 5 is a cross-sectional detail taken substantially on a plane passing along line 5—5 in FIG. 3 and illustrating the extended position of the feeding apparatus wherein the star wheel is locked into position.

FIG. 6 is a cross-sectional detail taken substantially on a plane passing along line 6—6 in FIG. 4 wherein the feeding mechanism is retracted preparatory to advancing the pod carrying star wheel.

FIG. 7 is a plan view of a pod module of the present invention.

FIG. 8 is an elevational view of the pod module of FIG. 7.

FIG. 9 is a plan view of a segment of belt made up of pod modules of the type shown in FIGS. 7 and 8.

FIG. 10 is an elevational view, partly in cross-section, of the belt segment of FIG. 9.

FIG. 11 is a plan view of another embodiment of a pod module of the present invention.

FIG. 12 is an elevational view of the pod module of FIG. 11.

FIG. 13 is a plan view of a segment of belt made up of pod modules of the type shown in FIGS. 11 and 12.

FIG. 14 is an elevational view, partly in cross-section, of the belt segment of FIG. 13.

FIG. 15 is a fragmentary elevational view of a screw driven into a workpiece from a belt of the type shown in FIGS. 13 and 14 and further illustrates the washer stripped from its pod by the screw.

DESCRIPTION OF THE PREFERRED EMBODIMENTS

Figure 1:
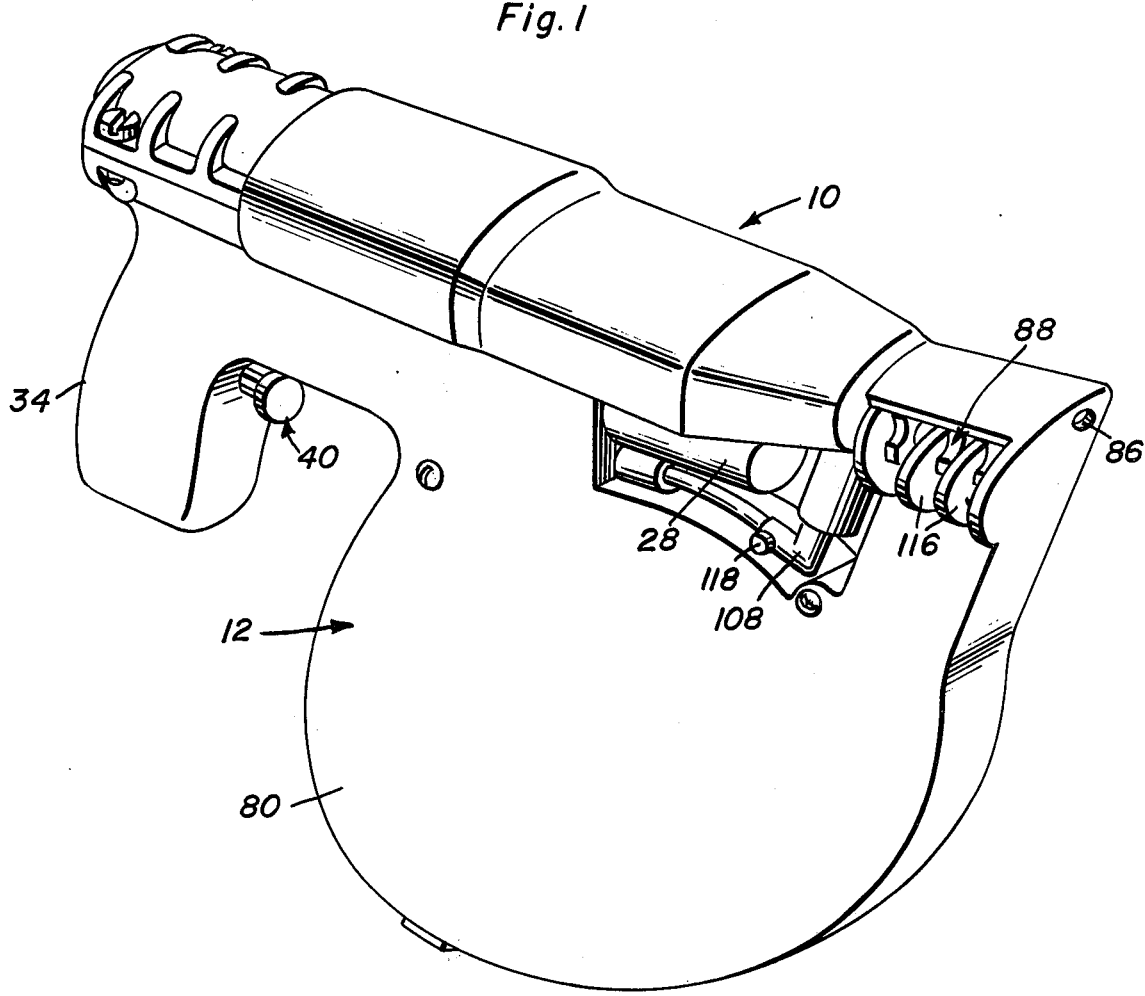
FIG. 1 is a perspective view of the apparatus or tool of the present invention.

Referring now more specifically to the drawings, reference numeral 10 is used to generally designate the screwdriving tool comprising the present invention. This tool 10 includes an enlarged housing 12 incorporating a rearwardly opening horizontally elongated chamber or bore 14 which removably receives a conventional air-powered screwdriver 16.

The rear portion of the screwdriver 16 rests within an upwardly directed saddle 18 projecting upwardly from a carriage unit 20. The screwdriver 16 is clamped to the carriage by an overlying clamp portion 22 which mates with the saddle 18 and bolts thereto in a manner so as to completely encircle the rear portion of the screwdriver 16 and intimately lock the screwdriver 16 to the carriage 20 for longitudinal reciprocating movement therewith as shall be explained presently.

The carriage 20, below the saddle 18, is in the nature of an elongated hollow stepped tube with the enlarged rear portion 22 thereof being slidably received over a forwardly projecting hollow tubular support 24. The elongated reduced diameter forward portion 26 acts in the nature of a piston and is slidably received within a forwardly located chamber 28 in sealed relation to the wall thereof.

An elongated air tube 30 extends forwardly from the rear of the tubular support 24 centrally therethrough, through the two carriage portions 22 and 26 and to the forward end of the cylinder 28. The forward piston end of the carriage portion 26 is provided with appropriate seals so as to slide along the cylinder received portion of the air tube 30 in an airtight manner. An expanded coil compression spring 32 is positioned about the air tube 30 and has the forward end thereof seated against the inner face of the piston end of the section 26 with the rear end thereof seated within the rear of the tubular support 24.

The casing 12 forms an enlarged handgrip 34 below the rear portion of the carriage 20. An air intake port 36 opens through the bottom of the handgrip 34 and is appropriately provided with coupling means for engagement with a source of pressurized air. The port 36, through an air passage 38, communicates with a trigger valve 40 of stepped configuration seated within an appropriate stepped bore 42. The valve 40 includes an annular air path or groove 44 circumferentially thereabout between the reduced diameter inner portion 46 thereof and the greater diameter outer portion 48 thereof. The larger outer pressure receiving face 50 of the circumferential air groove 44 results in a continuous outward biasing of the trigger valve 40 with the outward movement of the trigger valve 40 being limited by an appropriate stop ring 52 or the like affixed to the inner end of the valve 40.

FIG. 3 illustrates the trigger valve 40 in its normal outwardly biased position. In this position, the air flow is through the passage 38, about the circumferential valve air path or groove 44, through an air port 54 in the bore 42 circumferentially removed from the air passage 38, through a second air passage 56 paralleling the bore 42 and communicating with an air passage 58. The air passage 58 extends to and into communication with the rear end of the elongated air tube 30 which in turn, as previously indicated, communicates with the forward end of the cylinder 28. This introduction of pressurized air into the forward end of the cylinder 28 forces the piston end of the carriage 20 rearwardly, retracting the carriage and the screwdriver 16 mounted thereon. This rearward movement of the carriage 20 is effected against the biasing force of the spring 32.

Upon a squeezing or inward moving of the trigger valve 40, noting FIG. 4 in particular, communication between the air inlet passage 38 and the bore port 54 is terminated with the port 54, and hence the cylinder 28 through the air tube 30, air passage 58 and air passage 56, communicated with an exhaust port 60 by means of a second circumferential air path or groove 62 provided about the outer portion of the trigger valve 40. At the same time, the air intake passage 38 is, through the circumferential air path or groove 44, communicated with an air passage 64. This air passage 64 introduces the pressurized air into the interior of the cylindrical body of the carriage 20 causing a buildup of pressure at the piston end thereof in conjunction with an exhausting of the cylinder 28 through the air tube 30. This in turn results in a forward driving of the carriage 20 with the air-powered screwdriver 16 mounted thereon. It wil be noted that while the enlarged cylindrical rear portion 22 of the carriage 20 telescopes over the tubular mount 24 in sliding sealed relationship therewith, the interior of the tubular mount 24 is in open air passing communication with the interior of the cylindrical carriage portions 22 and 26 to allow for the free movement of pressurized air thereinto through the passage 64.

It is contemplated that the air-powered screwdriver 16 be activated simultaneously with the forward movement of the carriage. Accordingly, the screwdriver 16 is so clamped to the carriage as to orient the input port 66 thereof in direct pressure receiving communication with the discharge end of an elongated air passage 68, the opposite end of which communicates with the interior of the rear cylindrical carriage portion 22 at the forward end thereof. Thus, as pressurized air is introduced through the air passage 64 into the interior of the hollow cylindrical portion of the carriage 20, the air flow simultaneously enters and activates the screwdriver 16. Thus, as the carriage 20 is driven forward, carrying the screwdriver 16, the screwdriver is rotatably driving the forwardly projecting screwdriver bit 70 which is stabilized within a suitable forwardly positioned bearing 72.

Upon a release of the trigger valve 40, it is automatically biased to its outwardly projecting normal position closing off air passage 64 and recommunicating the air port 54 with the intake passage 38 for the introduction of pressurized air into the cylinder 28 so as to effect a retraction of the carriage 20. The air remaining in the cylindrical carriage portions 22 and 26 escapes through air passage 68 into the screwdriver 16 and from there to the atmosphere by appropriate venting means commonly provided on conventionally available air-powered screwdrivers of the type incorporated herein.

The present invention also contemplates the provision, in the apparatus 10, of a supply of screws 74 in conjunction with means for sequentially presenting these screws 74 into position for driving by the activated screwdriver 16. In accordance therewith, the individual screws 74 are mounted within separate plastic pods 76 having opposed open ends and link connected into an elongated belt 78 which is coiled within an enlarged canister positioned below the forward end of the screwdriver bore or chamber 14. This canister is generally designated by reference numer 80 with access thereto being obtained through the provision of a removable side panel or the like on the casing 12. The canister 80 is set slightly rearward of the upper forward end 82 of the casing 12 and a forwardly and upwardly inclined throat or throat portion 84 extends from the canister 80 to the extreme leading end 82 of the casing 12 with the pods being fed upwardly therethrough in a manner which shall be described presently. As will be appreciated, this slight rearward offsetting of the canister 80 allows for a flat positioning of the leading end 82 of the casing 20 against the workpiece, the screw being driven through an appropriate aperture 86 in this leading end 82.

The feeding of the screw containing pods 76 into position for alignment of the screws 74 sequentially with the advancing screwdriver bit 70 is effected by an assembly which includes a conical star wheel unit 88 defining a series of circumferentially spaced pod receiving pockets 90. The conical configuration of the unit 88 is significant in that it enables a reception of the pods from the inclined pod feeding throat 84 and a subsequent movement of the pods into horizontal alignment with the screwdriver bit 70.

An enlarged positioning disk 92 is affixed to the inner end of the star wheel unit 88 for rotation therewith. This positioning disk 92 includes a series of circumferentially spaced openings 94 therein which align with the pod receiving pockets or seats 90 and are of a size so as to allow for the free movement of the screwdriver bit 70 therethrough into engagement with the pocket carried screw pods. The entire star wheel unit 88 is of course appropriately shaft mounted within the casing 12 at the upper end of the throat 84 for controlled rotational movement.

The inner face of the positioning disk 92 includes a series of inwardly projecting positioning pins 96 at equally spaced points thereabout. A positioning block 98 is mounted within the casing 12 for vertical reciprocation adjacent the inner pin bearing face of the positioning disk 92. This block 98 is biased downwardly by a pair of spaced coiled compression springs 100 engaged between the upper face of the block 98 and a fixed abutment portion of the casing 12 thereabove.

Figure 2:
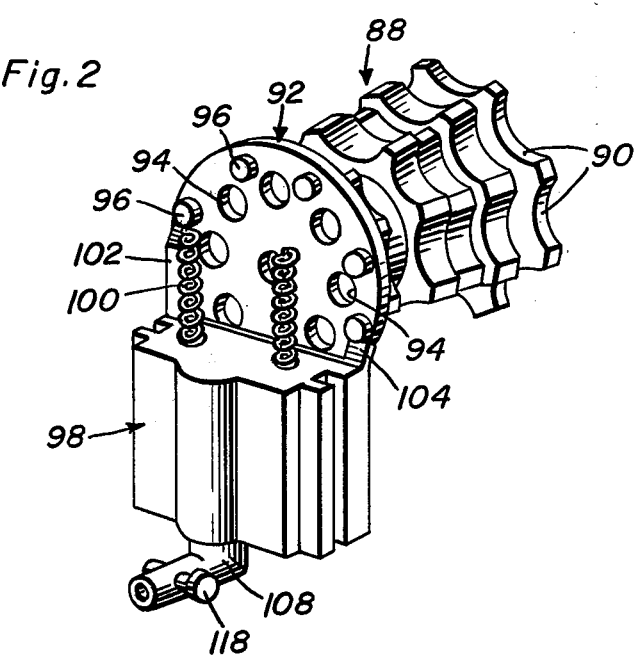
FIG. 2 is a perspective view of the pod feeding or advancing assembly.

Noting FIGS. 2, 5 and 6 in particular, the positioning block 98 mounts a first elongated spring pawl 102 and a second substantially shorter rigid pawl 104. In the extended position of the block 98, illustrated in FIGS. 2 and 5, both pawls are engaged beneath approximately diametrically opposed positioning pins 96 whereby the positioning disk 92 and the associated star wheel unit 88 are locked into position. Upon a downward retraction of the positioning block 98, the short rigid pawl 104 drops completely below the positioning disk 92 with the spring pawl 102 moving downward from the previously engaged upper pin 96 and riding over a vertically aligned lower pin 96 to snap engage immediately therebeneath. Thus, upon a subsequent upward movement of the positioning block 98, the spring pawl 102 will effect a rotation of the disk 92 until, at the upper position of the block 98, the rigid pawl 104 is again brought into overlying relation with the disk 92 and in stabilizing engagement beneath the subsequent positioning pin 96 generally diametrically opposed from the pin 96 now engaged by the upwardly moved spring pawl 102. Thus, by a vertical reciprocation of the positioning block 98, the star wheel will be advanced in a step-by-step manner to sequentially bring the screw bearing pods into alignment with the screwdriver 16.

This reciprocating movement of the positioning block 98 is to be effected automatically and in synchronization with the powering of the screwdriver 16. Accordingly, the positioning block 98 is provided with a downwardly directed internal air chamber 106, the positioning block 98 constituting in effect an air cylinder. The chamber 106 is telescopically received over the discharge end of an air passage 108 with appropriate O-ring seals or the like 110 providing for a sealed sliding relationship therebetween. The air passage 108 in turn communicates with the rear of the cylinder 28, through port 112, immediately forward of the piston end of the carriage portion 16 in its retracted position as illustrated in FIG. 3.

With this arrangement, in the position of FIG. 3, with the trigger valve 40 released and in its normal outward position, pressurized air passing through the air tube 30 into the cylinder 28 also flows through port 112 and air passage 108 into cylinder chamber 106 effecting an upward shifting of the positioning block 98 and a rotation of the star wheel unit 88 so as to present a new screw bearing pod into alignment with the screwdriver bit 70.

Upon an inward pressing of the trigger valve 40 so as to activate and forwardly move the screwdriver 16, the forward movement of the carriage portion 26 seals the port 112, locking the pressure within the line 108 and the positioning block 98 in its forward position. At the completion of the forward movement of the screwdriver carrying carriage 20, the pressure within the air passage 108 and cylinder chamber 106 is bled outwardly through an escape port 114 in the outer wall of the carriage portion 26 which is brought into alignment with the port 112. Upon an exhausting of the air from the passage 108 and chamber 106, the springs 100 retract the positioning block 98 releasing the star wheel unit 88 for the subsequent indexing of the star wheel so as to bring another pod into position. The next pod is brought into position upon a release of the trigger valve 40 whereby the pressurized air is redirected into the cylinder 28 effecting the retraction and deactivation of the screwdriver 16 in conjunction with a rotation of the star wheel unit 88 so as to position a new pod in alignment with the screwdriver bit 70 through an upward movement of the positioning block or cylinder 98.

It will be appreciated that the pods 76 themselves constitute individual guides for the screws 74 during the driving thereof, thus avoiding undue wear on the basic apparatus 10, as well as the necessity for providing elaborate screw receiving and guiding means as is now frequently the case in automatic implements of this type. The exhausted pods, noting FIG. 1, will be discharged laterally from the casing 12, appropriate outwardly projecting guide lugs 116 being provided. Also, in order to simplify the loading of the belt 78 and the engagement of the leading end thereof with the star wheel unit 88, an appropriate manual exhaust valve 118 can be provided in the line 108. An opening of the valve 118 will exhaust the line 108 and cylinder chamber 106 resulting in a retraction of the positioning block 98 and thereby allow for a free rotation of the star wheel unit 88 during the loading operation.

From the foregoing, it will be appreciated that a highly unique tool has been devised. This tool enables the incorporation of an air-powered screwdriver into an implement which, utilizing a single power source, provides for an automatic feeding of screws for a power driving thereof by the air-powered screwdriver through a single two position trigger valve. The casing is so constructed as to position the reciprocating screwdriver at the upper portion thereof above both the trigger mounting handgrip and the belt containing canister, the canister being slightly rearwardly offset from the forward discharge point of the driven screws. In this manner, the tool is easily handled and can be conveniently manipulated in corners and the like. The single control operation, as well as the compact nature of the assembly is of significance in providing a tool which can be held and operated by one hand. In connection therewith, it will be noted that the discharge end of the tool is positioned directly against the workpiece and the trigger actuated. The operator is not required to manipulate the tool during the actual driving operation in that the forward movement of the powered screwdriver is effected internally within the casing in an automatic manner. By the same token, the retraction of the screwdriver and subsequent positioning of a new screw is also automatically effected by merely a release of the trigger valve. It will of course be appreciated that appropriate seals are provided as required throughout the apparatus.

Returning to FIG. 3 it will be evident that the belt of screw-containing pods 76 of the present invention must be such that the belt may be coiled within canister 80. It will further be evident that as the belt is drawn through throat portion 84 of the tool by star wheel unit 88, the belt is twisted so that the axes of the pods within the throat lie at substantially right angles to the axes of the pods within the canister.

A first embodiment of a belt of screw-containing pods of the present invention is illustrated in FIGS. 7 through 10. FIGS. 9 and 10 illustrate a segment of the belt, generally indicated at 120. As is most clearly seen in FIG. 10, each pod 76 comprises an upper substantially cylindrical portion 76a and a lower substantially cylindrical portion 76b. Furthermore, the belt 120, itself, is made up of pod modules comprising the upper portion 76a of one pod 76 and the lower portion 76b of an adjacent pod 76. FIGS. 7 and 8 are respectively a plan view and a side elevational view of a typical pod module, generally indicated at 122.

The pod modules of the present invention lend themselves well to being molded from any appropriate plastic material such as polyethylene. While substantially cylindrical in configuration, the upper pod portion 76a of the pod module, to facilitate the molding procedure, may have a slightly greater external diameter at its bottom end than at its top end and a slightly greater internal diameter at its top end than its bottom end. Throughout its length, the internal diameter of the upper pod portion 76 is slightly greater than the diameter of the head of screw 124. Near its lowermost end, upper pod portion 76a is provided with an annular rim 126.

The lower pod portion 76b of pod module 122 is also substantially cylindrical. Again for purposes of the molding procedure it may be provided with a slightly larger external diameter at its upper end than at its lower end. Near its upper end, the lower pod portion 76b is provided with an annular notch 128. Beneath the annular notch the wall of the lower pod portion 76b is thickened so as to form an annular shoulder 130. Annular notch 128 is so sized as to receive the annular rim 126 of the upper pod portion 76a of the next adjacent pod module with a snap fit. The lowermost edge of that upper pod portion 76a may rest upon the shoulder 130 of the lower pod portion 76b. In this way, adjacent pod modules 122 are joined together to form a continuous belt 120.

Substantially intermediate its ends, lower pod portion 76b is provided with a plurality of inwardly and downwardly extending fingers 132. The fingers 132 are substantially triangular in configuration and their innermost ends form an opening having a diameter substantially equal to the root diameter of screw 124. The fingers 132 are held in place by integral webs 136 extending between adjacent fingers. The wall of the lower pod portion 76b below fingers 132 is somewhat thinner assuring room for the fingers to be depressed by a sufficient amount to permit passage of the head of screw 124 past the fingers during the final stages of the screwing operation.

Finally, the pod module 122 is completed by a strap-like link element 138 being integral and one-piece with the upper edge of the lower pod portion 76b and the lower part of upper pod portion 76a. While link 138 may have any appropriate cross-sectional configuration, the rectangular cross-sectional configuration of the strap as shown in FIGS. 7 through 10 permits a portion of the link to rest upon the upper edge of the lower pod portion 76b of the adjacent pod module with the result that when the pod modules are assembled into a belt the individual pods 76 of the belt tend to remain with their axes substantially parallel to each other. Link 138, on the other hand, is capable of being twisted so that the axes of adjacent pods may assume non-parallel positions permitting the belt to be twisted as described above.

When the individual pod modules 122 are joined together to form a belt, the snap fit of the annular rim 126 of an upper pod portion 76a of one pod module into the annular groove 128 of the lower pod portion 76b of the next adjacent pod module is such as to permit relative rotation of the upper pod portion 76a and the lower pod portion 76b of each individual pod 76. This, in turn, permits the belt to be coiled for insertion into canister 80.

When fully assembled, the belt is as illustrated in FIGS. 9 and 10 and is of a length such as to be accommodated in canister 80. The individual pods 76 are provided with screws 124. Each screw is threaded through the opening 134 formed by the ends of fingers 132 in its respective pod. The fingers thus serve to maintain the screw within its respective pod. When an individual pod is brought by star wheel unit 88 to the position wherein its screw may be driven by screwdriver 16, it will be evident that screw 124 will be properly oriented within its pod for driving. This is true by virtue of fingers 132 and the fact that the internal diameter of the upper pod portion 76a is only slightly larger than the head of screw 124. The screw, thus properly centered within its pod, will remain so during the driving operation. When the head portion of screw 124 passes out of the upper pod portion 76a and approaches fingers 132 in the lower pod portion 76b, the screw is already firmly held in the workpiece. The head of the screw will deflect and pass beyond fingers 132 causing webs 136 to stretch and/or rupture. Upon completion of the screwdriving operation, the star wheel unit 88 will cause the next screw-containing pod to reach its driving position. As indicated heretofore, the ability of the upper portion 76a and lower portion 76b of each individual pod to rotate with respect to each other about the snap engagement between annular groove 128 and annular rim 126 enables the belt to be coiled with all of the axes of the individual pods 76 being substantially parallel to each other and substantially perpendicular to a plane passing through the annular rim 126 and annular groove 128 of each of the pods. This same rotation enables the pods to pass about star wheel unit 88. The ability of integral link 138 between pods to be twisted enables the axes of adjacent pods to assume non-parallel orientations whereby the pods may be drawn by the star wheel assembly from canister 80 through throat 84. This same twisting ability also permits each pod to assume its screwdriving position with the axis of the screw therein being substantially coaxial with the axis of the screwdriver bit 70.

A second embodiment of the belt of the present invention is illustrated in FIGS. 11 through 14. The embodiment of FIGS. 11 through 14 differs from the embodiment of FIGS. 7 through 10 only in the screw centering means located within the bottom portion of each screw pod. Consequently, like parts have been given like index numerals.

It will be noted that the belt segments 120 are again made up of individual pod modules 122, each comprising an upper pod portion 76a and a lower pod portion 76b joined by an integral link 138. The upper pod module 76a is again provided with an annular rim 126 and the lower pod module is provided with an annular groove 128 constituting a rotatable snap-connection between the upper and lower portions of the individual pods 76. This rotatable joint serves the same purpose as described with respect to the embodiment of FIGS. 7 through 10, as does the twistable link 138.

Referring particularly to FIGS. 11 and 14, the screw centering and retaining means in the lower pod portion 76b constitutes a disk or washer-like structure 140 rather than the plurality of fingers 132, as in the embodiment of FIGS. 7 through 10. The washer-like element is integrally attached to the inside surface of lower pod portion 76b by means of a plurality of radially oriented integral webs 142.

The washer-like retaining and centering means 140 has a depressed central portion provided with a central perforation 144. As is most clearly seen in FIG. 14, the perforation 144 is tapered so as to have a diameter at its lower end less than the major diameter of screw 146 and at least approaching the root diameter of this screw. This enables the washer-like element 140 to retain screw 146 within the pod 76.

The assembly of the belt segments 120 of FIGS. 13 and 14 is identical to that described with respect to FIGS. 9 and 10. During the initial portion of the screw-driving operation the head of screw 146 will cooperate with the upper portion 76a of pod 76 and the shank portion of the screw will cooperate with the washer-like element 140 to maintain the screw properly centered. By the time the head of screw 146 passes through the upper pod portion 76a, the screw will have been driven well into the workpiece. Upon contact of the washer-like element 140 by the screw head, further driving of the screw will cause webs 142 to rupture or break and screw 146 will carry the now free washer-like element 140 with it toward the workpiece.

FIG. 15 illustrates the screw 146 fully driven into workpiece 148. It will be noted that the element 140 acts as a washer for screw 146, having been flattened between workpiece 148 and the head of screw 146. In all other respects, the pod modules and belt assembly of FIGS. 11 through 14 will function in the same manner described with respect to the embodiment of FIGS. 7 through 10.

It will be understood by one skilled in the art that the nature of the screw located in the individual pods 76 of the embodiments of FIGS. 7 through 10 and 11 through 14 does not constitute a limitation on the present invention. The screws 124 and 146 have been, for purposes of an exemplary showing, illustrated as Phillips screws, although they may be provided with conventional slots or other engagement means, the screwdriver bit 70 having been appropriately selected.

It will be understood that the screw 146 of FIG. 14 could be located in the pod 76 of FIG. 10 and that the screw 124 of FIG. 10 could be located in the pod 76 of FIG. 14. The nature of the screw used will depend upon the work being done. For example, the screw and structure of FIG. 10 would be excellent for dry wall work and the like. The screw and structure of FIG. 14 would be useful in metal work. The washer-like element 140 can serve any appropriate purpose. For example, being a molded plastic member, it may serve as a sealing means, lock washer or the like.

Modifications may be made in the invention without departing from the spirit of it. It should be specifically understood that the pods of the belt of the present invention can be utilized to house and guide the shank and head respectively of any fastener.

The embodiments of the invention in which an exclusive property or privilege is claimed are defined as follows:

1. An automatic screwdriving tool comprising a casing, an air-powered screwdriver, a carriage mounting said screwdriver in said casing, air pressure drive means for reciprocating said carriage between a forward screw engaging and driving position and a rear retracted position, said casing including a canister for retaining a supply of screws, air pressure control feeding means for sequentially feeding screws from said canister to a point forward of the carriage mounted screwdriver for a selective engagement of the screwdriver therewith upon a forward movement of the carriage, a single control means for said air pressure carriage drive means and said air pressure feeding means said feeding means for sequentially feeding screws including a star wheel unit mounted within said casing forward of said carriage for individually drawing the screws from the canister and sequentially positioning the screws in driving relation to the carriage mounted screwdriver, said screws being fixed within individual pods interconnected into an elongated canister received belt, said wheel incorporating peripherally spaced pod receiving seats thereabout.

2. The tool of claim 1 including a positioning disk fixed to one face of the star wheel unit, said disk including peripherally spaced openings therethrough alligned with the wheel seats for the passage of a screwdriver bit therethrough, and means for progressively stepping said wheel to sequentially present the peripheral seats and the pods carried thereby.

3. The tool of claim 2 wherein the means for progressively stepping said wheel comprises a plurality of peripherally spaced positioning pins projecting from said positioning disk, a positioning block, means for reciprocating said block parallel to and adjacent said disk, and block mounted pawl means for engaging said disk pins and rotating said disk and star wheel in response to reciprocation of said positioning block.

4. The tool of claim 3 wherein said positioning block reciprocates toward and away from said disk, said pawl means comprising an elongated spring pawl engageable behind an aligned pin upon movement of the positioning block toward said disk for a rotation thereof, said pawl being freely movable over the sequentially next pin for engagement therebehind upon movement of the positioning block away from said disk.

5. The tool of claim 4 including a rigid pawl on said positioning block spaced from said spring pawl and selectively engageable beneath a pin substantially diametrically opposed from the pin engaged by the spring pawl upon movement of the positioning block toward the disk and rotation of the disk to a position aligning a screw pod with the carriage mounted screwdriver.

6. The tool of claim 5 including spring means biasing said positioning block away from said disk.

7. The tool of claim 6 wherein said positioning block includes an air chamber, said chamber telescopically receiving the discharge end of an air passage therein for sliding reciprocating movement of the block thereon in response to selective introduction and exhausting of pressurized air to and from said chamber.

8. The tool of claim 7 wherein the introduction of air into said positioning block chamber effects a movement of the block toward said disk against the biasing force of said spring to effect a rotation of said star wheel unit.

9. The tool of claim 8 wherein said screwdriver mounting carriage includes a piston-like unit fixed thereto, a cylinder in said casing slidably receiving said piston-like unit, said air pressure drive means including a first air passage communicating with the interior of the cylinder forward of the piston-like unit for effecting an outward driving of the unit and carriage therewith, and a second air passage communicating with the piston-like unit to the rear thereof for effecting an inward driving of the unit and carriage therewith.

10. The tool of claim 8 including a single inlet for pressurized air, an air intake passage leading inward from said air inlet, said first and second air passage being selectively communicated with said air intake passage through a single two position trigger valve.

11. The tool of claim 10 including air passage means communicating said air passage with the air-powered screwdriver for effecting a pressurized driving thereof in conjunction with an inward driving of the carriage in response to communication of the second air passage with the air intake passage.

12. The tool of claim 11 wherein said positioning block engaged air passage communicates with said first air passage for movement of the positioning block toward said disk and rotation of the star wheel unit in conjunction with the outward driving of the carriage in response to communication of the first air passage with said air intake passage.

13. An automatic screwdriving tool comprising a casing, an air-powered screwdriver, a carriage mounting said screwdriver in said casing, air pressure drive means for reciprocating said carriage between a forward screw engaging and driving position and a rear retracted position, said casing including a canister for retaining a supply of screws, air pressure control feeding means for sequentially feeding screws from said canister to a point forward of the carriage mounted screwdriver for a selective engagement of the screwdriver therewith upon a forward movement of the carriage, and single control means for said air pressure carriage drive means and said air pressure feeding means, said screwdriver mounting carriage including a piston-like unit fixed thereto, a cylinder in said casing slidably receiving said piston-like unit, said air pressure drive means including a first air passage communicating with the interior of the cylinder forward of the piston-like unit for effecting an outward driving of the unit and carriage therewith, and a second air passage communicating with the piston-like unit to the rear thereof for effecting an inward driving of the unit and carriage therewith.

14. The tool of claim 13 including a single inlet for pressurized air, an air intake passage leading inward from said air inlet, said first and second air passages being selectively communicated with said air intake passage through a single two position trigger valve.

15. The tool of claim 14 including air passage means communicating said second air passage with the air-powered screwdriver for effecting a pressurized driving thereof in conjunction with the inward driving of the carriage in response to communication of the second air passage with the air intake passage.

16. The tool of claim 15 wherein the air pressure control feeding means for sequentially feeding screws from the canister includes a pressurized air passage communicated with said first air passage for the reception of pressurized air therefrom upon a communication of the first air passage with said air intake passage for the sequential feeding of screws in conjunction with an outward driving of the screwdriver mounting carriage.

17. An automatic screwdriving tool comprising a casing, an air-powered screwdriver, a carriage mounting said screwdriver in said casing, air pressure drive means for reciprocating said carriage between a forward screw engaging and driving position and a rear retracted position, said casing including a canister for retaining a supply of screws, air pressure control feeding means for sequentially feeding screws from said canister to a point forward of the carriage mounted screwdriver for a selective engagement of the screwdriver therewith upon a forward movement of the carriage, and single control means for said air pressure carriage drive means and said air pressure feeding means, said feeding means for sequentially feeding screws including star wheel means mounted within said casing forward of said carriage for individually drawing the screws from the canister and sequentially positioning the screws in driving relation to the carriage mounted screwdriver, said star wheel means incorporating peripherally spaced screw receiving seats thereabout.

18. The tool of claim 17 including a positioning disc fixed to one face of the star wheel means, said disc including peripherally spaced openings therethrough aligned with the wheel seats for the passage of a screwdriver bit therethrough, and means for progressively stepping said wheel to sequentially present the peripheral seats and the screws carried thereby.

* * * * *